United States Patent
Tu et al.

(10) Patent No.: US 8,469,543 B2
(45) Date of Patent: Jun. 25, 2013

(54) BACKLIGHT MODULE WITH MIXED-LIGHT LIGHT SOURCE MODULE AND MANUFACTURING METHOD THEREOF

(75) Inventors: Fu-An Tu, Hsin-Chu (TW); Chih-Lin Wang, Hsin-Chu (TW); Yueh-Jung Lee, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 978 days.

(21) Appl. No.: 12/539,071

(22) Filed: Aug. 11, 2009

(65) Prior Publication Data

US 2010/0067219 A1 Mar. 18, 2010

(30) Foreign Application Priority Data

Sep. 15, 2008 (TW) ................................ 97135399 A

(51) Int. Cl.
*F21V 9/00* (2006.01)
(52) U.S. Cl.
USPC .................. 362/231; 362/249.06; 362/249.02; 445/24
(58) Field of Classification Search
USPC ............... 257/40, 72, 98–100, 642–643, 759; 313/498–512; 315/169.1, 169.3; 427/58, 427/64, 66, 532–535, 539; 428/690–691, 428/917; 438/26–29, 34, 82, 455; 445/24–25; 362/543–549, 555, 800, 249.01–249.03; 345/589–593
See application file for complete search history.

(56) References Cited

U.S. PATENT DOCUMENTS

| | | | |
|---|---|---|---|
| 6,132,072 A * | 10/2000 | Turnbull et al. | 362/494 |
| 6,636,003 B2 * | 10/2003 | Rahm et al. | 315/179 |
| 8,018,427 B2 | 9/2011 | Hamada | |
| 2007/0158666 A1 * | 7/2007 | Yu et al. | 257/98 |
| 2007/0274093 A1 | 11/2007 | Haim et al. | |

FOREIGN PATENT DOCUMENTS

| | | |
|---|---|---|
| CN | 101206345 | 6/2008 |
| WO | 2007125623 A1 | 11/2007 |

OTHER PUBLICATIONS

Chinese language office action dated Oct. 23, 2009.
English language translation of abstract and pertinent parts of CN 101206345 (published Jun. 25, 2008).
Taiwan Office Action dated Feb. 15, 2012.
English language translation of abstract of WO 2007/125623 A1.
English language translation of abstract of TW 200925735, Published Jun. 16, 2009.

* cited by examiner

*Primary Examiner* — Donald Raleigh
(74) *Attorney, Agent, or Firm* — McClure, Qualey & Rodack, LLP

(57) ABSTRACT

A backlight module, a light source module used therein, and a manufacturing method thereof are provided. The light source module outputs a mixed light which has color coordinates falling into a target zone in a color space. The light source module has a plurality of interlaced first light sources and second light sources. The light generated by the first and the second light sources respectively have color coordinates falling into a first zone and a second zone in the color space. The first and the second zones are respectively areas having a maximum width smaller than or equal to 0.02. In addition, the first and the second zones are symmetrical relative to the target zone.

27 Claims, 8 Drawing Sheets

BACKLIGHT MODULE WITH MIXED-LIGHT LIGHT SOURCE MODULE AND MANUFACTURING METHOD THEREOF

This application claims priority based on a Taiwanese Patent Application No. 097135399, filed on Sep. 15, 2008, the disclosure of which is incorporated herein by reference in its entirety.

BACKGROUND OF THE INVENTION

1. Field of the Invention

The present invention relates to a backlight module, a light source module used therein, and a manufacturing method thereof. Particularly, the present invention relates to a backlight module utilizing the light-mixing technique, a light source module used therein, and a manufacturing method thereof.

2. Description of the Related Art

Display panels and flat panel displays (FPDs) utilizing display panels have gradually become the mainstream display devices nowadays. For example, panel screens, household flat-panel TVs, flat-panel screens for personal computers or laptop computers, display screens for mobile phones or digital cameras, etc. are products in need of display panels. Especially for the increasing market demand for liquid crystal displays (LCD), the design of backlight module for LCDs is getting diverse to meet the functional and exterior appearance requirements of LCDs.

Taking the edge type backlight module as an example, light emitting diodes (LEDs) have been employed as the light source. As shown in FIG. 1A, the backlight module includes an optical plate 10 and a light bar 30. A plurality of LEDs are disposed in a straight line to serve as the light source. In general, backlight modules adopt white LEDs as the source. However, due to limited process control of phosphor coating, the unevenness in chroma or color easily happens in white LED products. As shown in FIG. 1B, the spectrum distribution in a color space of white LEDs manufactured in the same manufacturing process usually forms a band, which has one end near the yellow light range while the other end near the blue light range. In order to provide a desired chromatic uniformity and to meet the standard white color screen, the common practice is to adopt the white LEDs of same chromaticity such as the LEDs having color coordinates falling into a specific zone 50. As described above, the white LEDs in a same manufacture batch, which have color coordinates falling outside the zone 50, can not be utilized, and therefore the cost is increased.

In some designs, special optical plates or packages are adopted to resolve the color unevenness problem of LEDs. However, this solution generally decreases the luminous efficiency and the brightness and increases the cost.

SUMMARY OF THE INVENTION

It is an objective of the present invention to provide a backlight module, which has a lower production cost.

It is another objective of the present invention to provide a backlight module, which exhibits a stable chromaticity.

It is yet another objective of the present invention to provide a manufacturing method of a backlight module, which reduces the production cost.

The backlight module of the present invention includes a light source module and a slice or plate shaped optical plate. The light generated by the light source module is outputted to the optical plate, and then the optical plate outputs the light to serve as the backlight. The light source module outputs a mixed light which has color coordinates falling into a target zone in a color space. A center of the target zone is a target point where a desired light is generated by the light source module. The light source module includes interlaced first light sources and second light sources. The light outputted by the first light sources has color coordinates falling into a first zone in the color space while the light outputted by the second light sources has color coordinates falling into a second zone in the color space. Each of the first zone and the second zone has a maximum width smaller than or equal to 0.02. The first zone and the second zone are symmetrical relative to the target zone. Through this design, the lights generated by the first light source and the second light source are mixed into a mixed light which has color coordinates falling into the target zone in the color space. Therefore, the mixed light generated by light source module can meet the design requirements.

The manufacturing method of the backlight module of the present invention includes the following steps. Firstly, a target zone is defined in a color space of a mixed light generated by the light source module. Secondly, a plurality of first light sources which output light having color coordinates falling into a first zone in the color space are picked. Thirdly, a plurality of second light sources which output light having color coordinates falling into a second zone in the color space are picked. Finally, the plurality of first light sources are interlaced with the second light sources.

DETAILED DESCRIPTION OF THE PREFERRED EMBODIMENT

The present invention provides a backlight module, a light source module used therein, and a manufacturing method thereof. In a preferred embodiment, the backlight module is applied to LCD devices. However, in other embodiments, the backlight module can be applied to computer keyboards, mobile phone keypads, billboards, and other devices in need of surface light sources. In a preferred embodiment, the LCD device of the present invention includes a color LCD device. However, in other embodiments, the LCD device of the invention may include a monochrome LCD device. Besides, the LCD device mentioned above generally means the display devices utilizing LCD panels, including household LCD televisions, LCDs for personal computers or laptop computers, the LCD screens of mobile phones and digital cameras, etc.

Figure 1A:
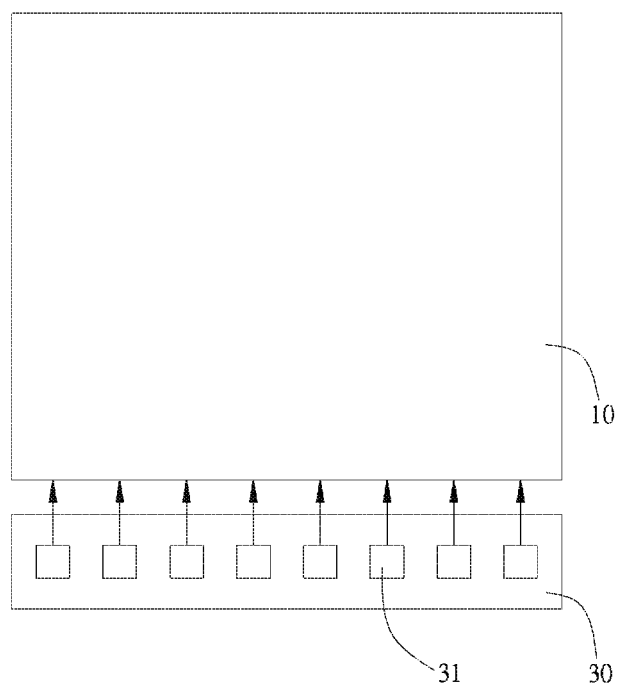
FIG. 1A is a schematic view of a conventional edge type backlight module.
Figure 1B:
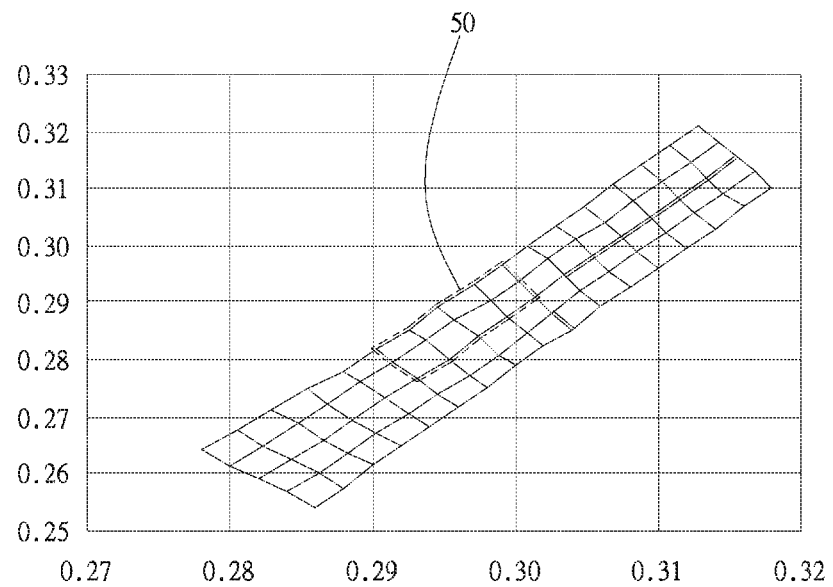
FIG. 1B is an schematic view of the spectrum of the white LCDs used in conventional backlight modules.
Figure 2:
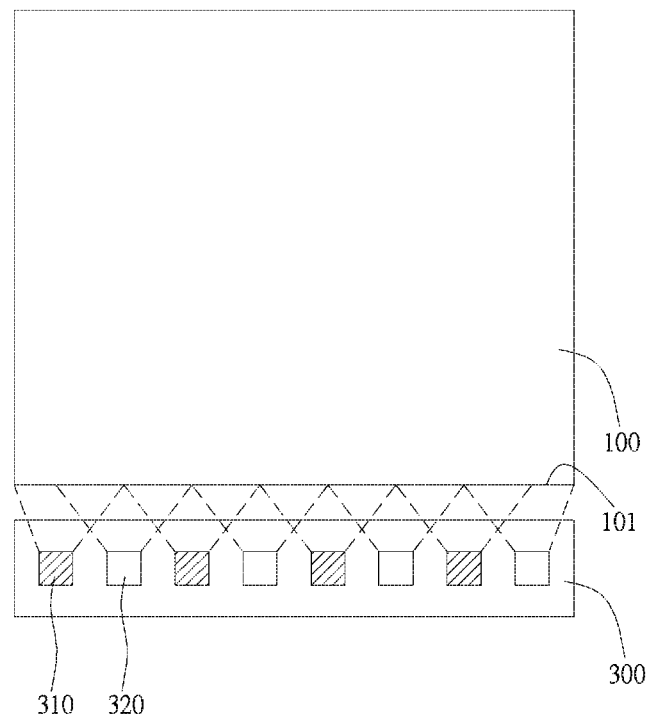
FIG. 2 is a schematic view of an embodiment of a backlight module of the present invention.
Figure 3:
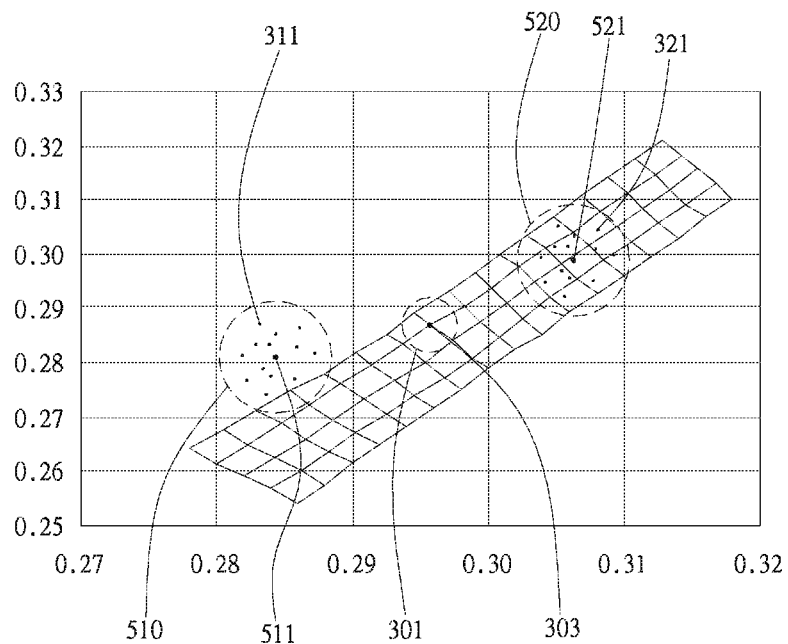
FIG. 3 is a schematic view of an embodiment of a first zone and a second zone in a color space.

As shown in FIG. 2, the backlight module of the present invention includes a light source module 300 and an optical plate 100. The light source module 300 is disposed close to the optical plate 100. The light generated by the light source module 300 is outputted to the optical plate 100. In this embodiment, the light source module 300 is an edge type light source, and the optical plate is a light guide plate. The light generated by the light source module 300 enters the optical plate 100 from its edge, and then is evenly distributed in the optical plate to act as an edge type backlight module. Furthermore, in this embodiment, the light source module 300 outputs a mixed light. As shown in FIG. 3, the mixed light has color coordinates falling into a target zone 301 in a color space, and a center of the target zone 301 is preferably a target point 303 where a desired light is generated by the light source module 300. In other words, the target point 303 represents the desired color coordinates of the mixed light provided by the light source module 300 while the target zone 301 is an allowable zone of the mixed light in the color space. However, the target point 303 can merely be any coordinate point in the color space, and the target zone 301 can be any zone in the color space. Moreover, the target zone 301 and the target point 303 both fall into a white gamut. In this embodiment, the gamut is mainly described by using the coordinate system of the CIE 1931 chromaticity diagram. However, in other embodiments, other color spaces or other corresponding units of measure can be used to represent the gamut.

As shown in FIG. 2, the light source module 300 includes interlaced first light sources 310 and second light sources 320. In a preferred embodiment, the first light sources 310 and the second light sources 320 are both white LEDs. There are many methods for the white LEDs to generate white light including, but not limited to, blue LED with yellow phosphor or blue LED with green phosphor and red phosphor. Any white LED capable of generating white light is included. As shown in FIG. 2, the first light sources 310 and the second light sources 320 are aligned in a straight line to form a light bar, and the first light sources 310 and the second light sources 320 are distributed along a side edge of the optical plate 100. Furthermore, each of the first light sources 310 is disposed between the adjacent second light sources 320, so that the first light sources 310 and the second light sources 320 are interlaced. In other words, the light generated by the first light sources 310 is mixed with the light generated by the second light sources 320 to generate a mixed light. Furthermore, the first light sources 310 and the second light sources 320 can be alternatively arranged to form a surface light source, and in turn to provide a direct type backlight module.

As shown in FIG. 3, the light outputted by the first light sources 310 has a color coordinate 311 falling into a first zone 510 in the color space. In other words, the first light sources 310 are light sources having the color coordinate 311 falling into the first zone 510. The first zone 510 has a maximum width smaller than or equal to 0.02. In the embodiment shown in FIG. 3, the first zone 510 is a circular region having a radius smaller than or equal to 0.01 in the color space. However, in other embodiments, the first zone 510 can have different shapes or different radiuses. The first zone 510 preferably falls into a white gamut and does not overlap the target zone 301, but is not limited thereto.

A color coordinate 321 of the light outputted by the second light sources 320 falls into a second zone 520 in the color space. In other words, the second light sources 320 are light sources having the color coordinate 321 falling into the second zone 520. The second zone 520 has a maximum width smaller than or equal to 0.02. As shown in FIG. 3, the second zone 520 is a circular region having a radius smaller than or equal to 0.01 in the color space. However, in other embodiments, the second zone 520 can have different shapes or different radiuses. The second zone 520 preferably falls into the white gamut and does not overlap the target zone 301, but is not limited thereto.

As shown in FIG. 3, the first zone 510 and the second zone 520 are symmetrical relative to the target zone 301. In other words, the target zone 301 is located in the central position between the first zone 510 and the second zone 520. Through this design, the lights generated by the first light sources 310 and the second light sources 320 are mixed into the mixed light which has color coordinates falling into the target zone 301. Therefore, the mixed light generated by the light source module 300 can meet the design requirements. Furthermore, a center 511 of the first zone 510 is symmetrical to a center 521 of the second zone 520 relative to the target point 303. Through this relationship, the relative positions of the first zone 510 and the second zone 520 can be reasonably defined.

Figure 4:
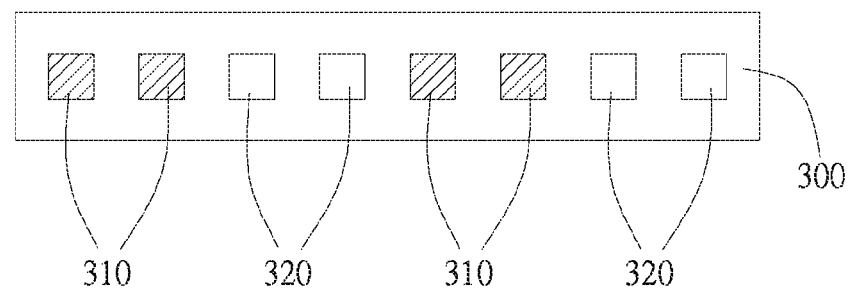
FIG. 4 is a schematic view of another embodiment of a light source module.

In the embodiment shown in FIG. 4, each of the first light sources 310 is disposed between the adjacent first light source 310 and the second light source 320. In other words, one first light source 310 and one second light source 320 are disposed at two sides of each of the first light sources 310, respectively. As shown in FIG. 4, the first light sources 310 are paired off, and the second light sources 320 are also paired off. That is to say, the first light sources 310 and the second light sources 320 are alternatively disposed in pair. For example, a pair of the second light sources 320 is disposed after a pair of the first light sources 310, and so forth. In this embodiment, because on at least one side of each first light source 310, one second light sources 320 is disposed, sufficient light mixing can be achieved.

Figure 5A:
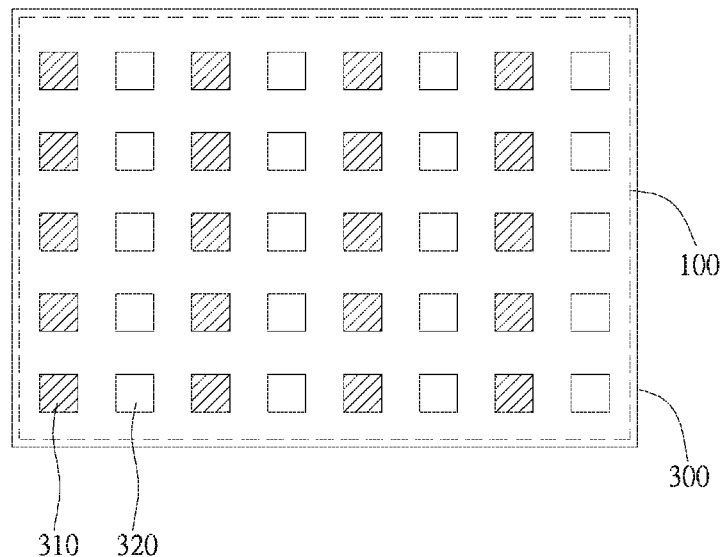
FIG. 5A is a schematic view of an embodiment, wherein the light source module forms a surface light source.

In the embodiment shown in FIG. 5A, the first light sources 310 and the second light sources 320 are arranged in an array form, so as to form a surface light source. In this embodiment, the optical plate 100 is disposed above the light source module 300 which is composed of the first light sources 310 and the second light sources 320, so that the light source module 300 is close to the bottom surface of the optical plate 100 and the lights generated by the first light sources 310 and the second light sources 320 enter the optical plate 100 from its bottom surface. In this embodiment, the optical plate 100 is preferably a diffuser plate, a prismatic brightness enhancement film, a dual brightness enhancement film, etc.

Figure 5B:
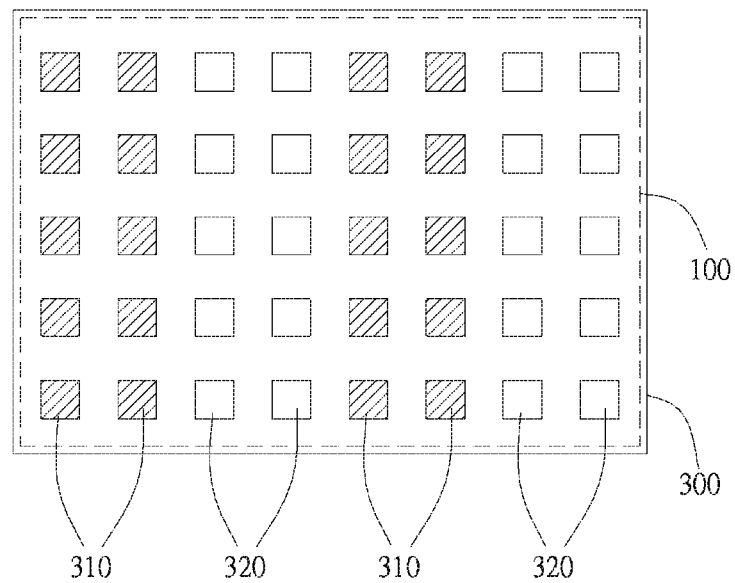
FIG. 5B is a schematic view of another embodiment, wherein the light source module forms a surface light source.

As shown in FIG. 5A, in the rows or the columns of the array, each of the first light sources 310 is disposed between the adjacent second light sources 320, so as to mix lights adequately. However, in other embodiments, as shown in FIG. 5B, each of the first light sources 310 is disposed between the adjacent first light source 310 and the second light source 320. In other words, the first light sources 310 are paired off, and the second light sources 320 are also paired off. That is to say, a pair of the second light sources 320 is disposed after a pair of the first light sources 310, and so forth. In this embodiment, because on at least one side of each first light source 310, one second light source 320 is disposed, sufficient light mixing can be achieved. Besides, the first light sources 310 and the second light sources 320 can be disposed randomly.

Figure 6:
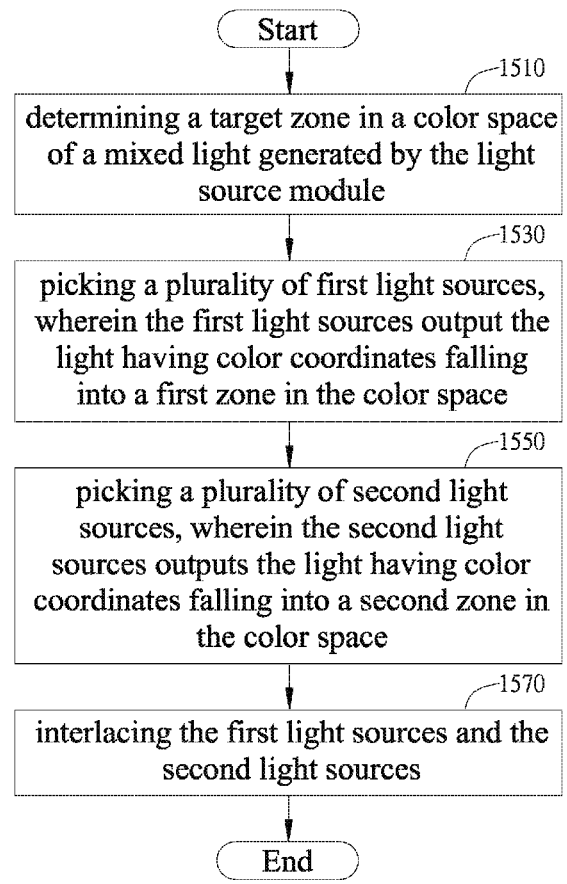
FIG. 6 is a flow chart of an exemplary method of manufacturing a backlight module.

FIG. 6 is a flow chart of an exemplary method of manufacturing the backlight module of the present invention. Step 1510 includes determining a target zone in a color space of a mixed light generated by the light source module. The target zone can be determined according to the product specification, so as to meet practical requirements of products. In a preferred embodiment, a target point can be determined firstly in this step (the target point is a point where a desired light generated by the light source module such as (0.313, 0.329) or (0.28, 0.288)). Then, the target point is set as a center having a predetermined radius to form a circular area as the target zone. The radius is preferably 0.01, but can be increased to 0.03 or changed to other values. Furthermore, the target point can merely be any coordinate point in the color space, and the target zone can also be any zone in the color space.

Step 1530 includes picking a plurality of first light sources, wherein the first light sources output the light having color coordinates falling into a first zone in the color space. In other words, the first light sources are light sources selected form the color coordinates falling into the first zone. The first zone has a maximum width smaller than or equal to 0.02. In a preferred embodiment, a first central position can be determined firstly in this step, then the first central position is set as a center having a predetermined radius to form a circular area as the first zone. The radius is preferably 0.01, but can be increased to 0.03 or changed to other values.

Step 1550 includes picking a plurality of second light sources, wherein the second light sources output the light having color coordinates falling into a second zone in the color space. In other words, the second light sources are light sources selected form the color coordinates falling into the second zone. The second zone has a maximum width smaller than or equal to 0.02, and the first zone and the second zone are symmetrical relative to the target zone. Therefore, after the target zone and the first zone are determined, the second zone can be determined accordingly. In a preferred embodiment, a second central position can be determined firstly in this step and the second zone and the first zone are symmetrical relative to the target zone, then the second central position is set as a center having a predetermined radius to form a circular area as the second zone. The radius is preferably 0.01, but can be increased to 0.03 or changed to other values.

Step 1570 includes interlacing the first light sources and the second light sources. In a preferred embodiment, the first light sources and the second light sources are aligned in a straight line to form a light bar. Furthermore, each of the first light sources is preferably disposed between two adjacent second light sources, so that the first light sources and the second light sources are interlaced. In other words, the light generated by the first light sources is mixed with the light generated by the second light sources to generate a mixed light. However, in other embodiments, each of the first light sources can be disposed between the adjacent first light source and the second light source. In other words, the first light source and the second light source are disposed at two sides of each of the first light sources respectively. The first light sources and the second light sources can be paired off. That is to say, a pair of the second light sources is disposed after a pair of the first light sources, and so forth. In this embodiment, because on one side of each first light source, one second light source is disposed, sufficient light mixing can be achieved.

Although the present invention has been described through the above-mentioned related embodiments, the above-mentioned embodiments are merely the examples for practicing the present invention. What need to be indicated is that the disclosed embodiments are not intended to limit the scope of the present invention. On the contrary, the modifications within the essence and the scope of the claims and their equivalent dispositions are all contained in the scope of the present invention.

What is claimed is:

1. A light source module for outputting a mixed light which has color coordinates falling into a target zone of white gamut in a color space of CIE chromaticity diagram, said light source module comprising:

a plurality of first light sources, outputting light having color coordinates falling into a first zone of white gamut in the CIE color space, wherein said first zone has a maximum width smaller than or equal to 0.02; and a plurality of second light sources being interlaced with said plurality of first light sources, outputting light having color coordinates falling into a second zone of white gamut in the CIE color space, wherein said second zone has a maximum width smaller than or equal to 0.02, said first zone and said second zone are symmetrical relative to the target zone in the CIE color space and the zone widths of said first zone and said second zone are distances on the CIE chromaticity diagram.

2. The light source module of claim 1, wherein said plurality of first light sources and said plurality of second light sources are aligned in a straight line.

3. The light source module of claim 2, wherein at least one of each of said first light sources between adjacent said second light sources.

4. The light source module of claim 2, wherein each of said first light sources is disposed between adjacent said first light source and said second light source.

5. The light source module of claim 1, wherein said plurality of first light sources and said plurality of second light sources are arranged in an array form.

6. The light source module of claim 5, wherein in the rows or the columns of said array, at least one of each of said first light sources is disposed between adjacent said second light sources.

7. The light source module of claim 5, wherein in the rows or the columns of said array, at least one of each of said first light sources is disposed between adjacent said second light sources.

8. The light source module of claim 1, wherein said first zone and said second zone are respectively a circular region having a radius smaller than or equal to 0.01 in the color space.

9. The light source module of claim 1, wherein said target zone has a target point, a center of said first zone is symmetrical to a center of said second zone relative to the target point.

10. A backlight module, comprising:

a light source module for outputting a mixed light which has color coordinates falling into a target zone of white gamut in a color space of CIE chromaticity diagram, said light source module including:

a plurality of first light sources, outputting light having color coordinates falling into a first zone of white gamut in the CIE color space, wherein said first zone has a maximum width smaller than or equal to 0.02; and a plurality of second light sources being interlaced with said plurality of second light sources, outputting light having color coordinates falling into a second zone of white gamut in the CIE color space, wherein said second zone has a maximum width smaller than or equal to 0.02, said first zone and said second zone are symmetrical relative to the target zone in the CIE color space and the zone widths of said first zone and said second zone are distances on the CIE chromaticity diagram; and an optical plate disposed close to said light source module, wherein said light source module outputs light to said optical plate.

11. The backlight module of claim 10, wherein said light source module is disposed close to a side edge of said optical plate, and said plurality of first light sources and said plurality of second light sources are distributed along the side edge of said optical plate.

12. The backlight module of claim 11, wherein said plurality of first light sources and said plurality of second light sources are aligned in a straight line.

13. The backlight module of claim 12, wherein at least one of each of said first light sources between adjacent said second light sources.

14. The backlight module of claim 12, wherein at least one of each of said first light sources between adjacent said second light sources.

15. The backlight module of claim 10, wherein said light source module is disposed close to a bottom surface of said optical plate, and the light outputted by said plurality of first light sources and said second light sources is issued toward the bottom of said optical plate.

16. The backlight module of claim 15, wherein said plurality of first light sources and said plurality of second light sources are arranged in an array form.

17. The backlight module of claim 16, wherein in the rows or the columns of said array, at least one of each of said first light sources is disposed between adjacent said second light sources.

18. The backlight module of claim 16, wherein in the rows or the columns of said array, at least one of each of said first light sources is disposed between adjacent said second light sources.

19. The backlight module of claim 10, wherein said first zone and said second zone are respectively a circular region having a radius smaller than or equal to 0.01 in the color space.

20. The backlight module of claim 10, wherein said target zone has a target point, a center of said first zone is symmetrical to a center of said second zone relative to the target point.

21. A method for manufacturing a light source module, comprising:
  defining a target zone of white gamut in a color space of CIE chromaticity diagram of a mixed light generated by said light source module;
  picking a plurality of first light sources which outputting light having color coordinates falling into a first zone of white gamut in the CIE color space, wherein said first zone has a maximum width as a diameter smaller than or equal to 0.02;
  picking a plurality of second light sources which outputting light having color coordinates falling into a second zone of white gamut in the CIE color space, wherein said second zone has a maximum width as a diameter smaller than or equal to 0.02, said first zone and said second zone are symmetrical relative to the target zone in the CIE color space and the zone widths of said first zone and said second zone are distances on the CIE chromaticity diagram; and
  interlacing said plurality of first light sources and said second light sources.

22. The method of claim 21, wherein the interlacing step includes interlacing said plurality of first light sources and said second light sources in a line manner to form a light bar.

23. The method of claim 22, wherein the step of interlacing in the line manner includes disposing at least one of each of said first light sources between adjacent said second light sources.

24. The method of claim 22, wherein the step of interlacing in the line manner comprises disposing each of said first light sources between adjacent said first light source and said second light source.

25. The method of claim 21, wherein the step of defining said target zone in the color space includes:
  defining a target point; and
  setting said target point as a center having a radius of 0.01 to form a circular area as said target zone.

26. The method of claim 25, wherein the step of picking said first light source comprising:
  determining a first central position; and
  setting said first central position as a center having a radius of 0.01 to form said first zone.

27. The method of claim 26, wherein the step of picking said second light source comprising:
  determining a second central position, wherein said second central position is symmetrical to said first central position relative to the target point; and
  setting said second central position as a center having a radius of 0.01 to form said second zone.

* * * * *